Figure 1:
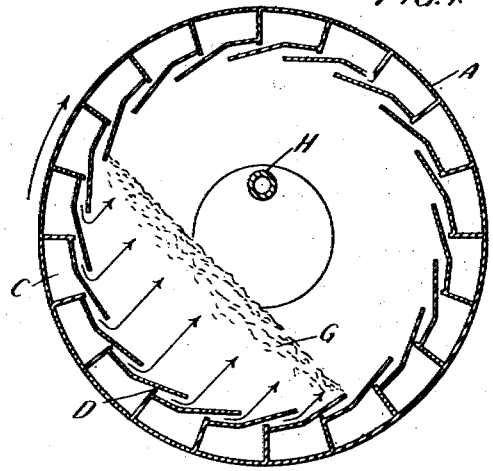

Oct. 22, 1929. A. H. PEHRSON 1,732,819
EXTRACTION OF SUBSTANCES FROM FLUIDS

Filed Nov. 17, 1927

Inventor:
Adam H. Pehrson

Patented Oct. 22, 1929

1,732,819

UNITED STATES PATENT OFFICE

ADAM HELMER PEHRSON, OF STOCKHOLM, SWEDEN

EXTRACTION OF SUBSTANCES FROM FLUIDS

Application filed November 17, 1927, Serial No. 234,025, and in Sweden October 7, 1926.

The subject of this invention is a method for the extraction from gases or liquids of substances suspended or dissolved therein.

According to the invention the gases or liquids to be treated are introduced into a rotary chamber and brought into contact with a charge of material in the said chamber while the said charge is being turned over with a tumbling movement, and are thereby diffused through the charge, and caused to deposit their suspended or contained substances in the charge. In the case of liquids they may be caused to evaporate by passing heated gases through the charge, while in the case of gases carrying condensable substances they may be caused to condense in the charge by keeping the charge at a low temperature. Gases carrying in suspension substances which are not condensable are passed transversely through the charge, which is preferably damped, and the said substances are thus removed from the gases by filtration.

In order to obtain the tumbling movement of the charge as above mentioned the inlet openings or other feeding devices in the chamber should be so arranged that the charge is maintained at such a depth (that is, at least one fourth of the diameter of the chamber) as to avoid its merely sliding round the interior of the chamber as the chamber rotates, because such movement in bulk of the charge would fail to give the charge the desired intimate contact with the fluids treated and mutual diffusion or intermixture therewith.

As examples of the gases that can be subjected to this treatment there may be mentioned vapours containing metals or chemicals, and gases containing condensable materials, tars or the like, and as examples of the liquids that can be subjected to this treatment there may be mentioned lyes or tailings produced in the pulp industry.

In the treatment of gases containing the substances in suspension or in solution, the said substances are recovered by precipitation by passing the said gases through the charge.

Condensable substances which are suspended in gases in the form of mist or vapour are subjected after diffusion in the charge, to condensation or absorption, the temperature being kept sufficiently low to facilitate such condensation. Although in some cases water may be used for cooling the charge, in other cases better results are obtained by using fluids of a thick and sticky character, for example tar or lye. Tar may be used in the condensation of tarry distillates, and liquid tailings or used lye from the pulp industry may be used in the condensation of the oily substances known as mercaptanes produced in the same industry. The fluid employed for cooling and condensing purposes can be injected into or spread upon the charge.

Tailings and similar liquids which are diffused through the charge may be subjected to evaporation in order that the charge may be used again, and such evaporation can be effected by passing warm gases through the charge. To reduce the amount of evaporation necessary it is also advantageous to use either concentrated substances or tailings to increase the proportion of solid matter contained therein.

After the suspended or contained substances are precipitated, condensed or absorbed by the charge, they can subsequently be treated by different suitable methods. All possibilities of such treatment cannot here be enumerated but the following examples may be mentioned.

The wood-substance, lignin, dissolved in the tailings from the pulp industry, can be recovered by discharging it as a coating or otherwise, on some combustible, such as wood-chips, sawdust, peat, etc., and after this the coated or impregnated substance can be used for fuel, preferably in the form of briquettes. In this case, if the charge consists of peat its impregnation or coating renders it a good binding material for making briquettes of other substances, such as ore, coal, etc.

If the tailings contain other chemical substances which require treatment, these can be recovered and obtained as a residue after the consumption of the impregnated and coated material by liquefaction, leaching, or other means.

Chemical substances obtained from gases can be treated in an analogous way. This is also the case with any other materials floating in gases, which can be separated from the charge by other suitable methods. In regard especially to the waste gases from the pulp industry the chemicals contained in the said waste gases are preferably deposited on the wood-substance intended to be used for making the pulp and can be either introduced along with the said substance into the dissolving vessels or separated therefrom before such introduction.

Figure 2:
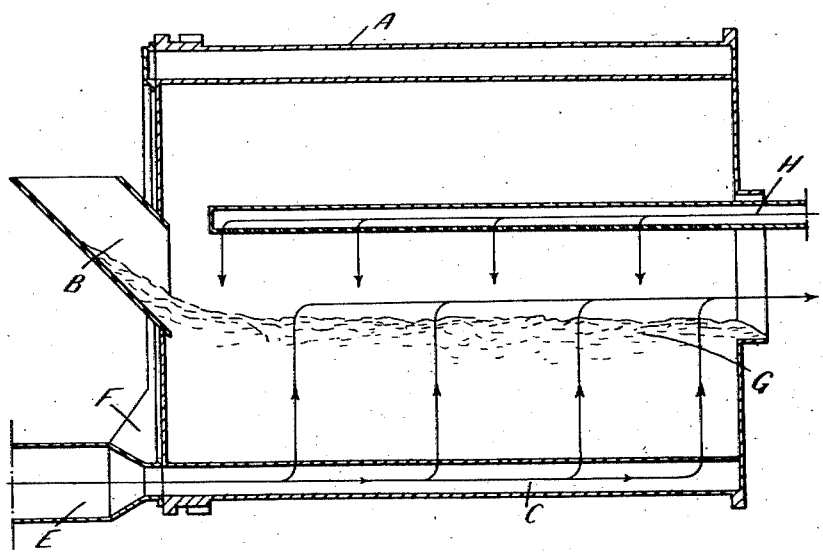

Apparatus for carrying the invention into effect is illustrated in the accompanying drawings in which Figures 1 and 2 are, respectively, a transverse and a longitudinal section through the rotary chamber and consists of a rotary or oscillatory chamber A provided with a suitable fitted opening B and longitudinally arranged channels C at or adjacent to the peripheral wall of the chamber A and communicating with the interior thereof through openings or slits D in the channels and with an external conduit E through a regulating device F which so operates that the gases or liquids can only pass through those channels which are covered by the charge G during the movement of the chamber A. When desired, the charge may be damped for the purpose as aforesaid by passing the damping liquid through a peripheral conduit H positioned within the rotary chamber.

What I claim and desire to secure by Letters Patent of the United States is:—

1. A method for the extraction from fluids of substances carried thereby which consists in passing the said fluids directly through a mass of granular material which is subjected to a continuous tumbling-over movement so that the fluid intimately mixes with the mass, and thereby causing the said substances to be extracted from the fluid and deposited on the granular material.

2. A method for the extraction from fluids of substances carried thereby which consists in passing the said fluids directly through a mass of granular material which is subjected to a continuous tumbling-over movement so that the fluid intimately mixes with the mass, thereby causing the said substances to be extracted from the fluid and deposited on the granular material and evaporating any superfluous liquid fluid by passing heated gases through the granular material.

3. A method for the extraction from gaseous fluids of condensable substances carried thereby which consists in passing the said fluids directly through a mass of granular material which is subjected to a continuous tumbling-over movement so that the fluid intimately mixes with the material, and thereby causing the said substances to be deposited on the material by condensation.

4. A method for the extraction from gaseous fluids of condensable substances carried thereby which consists in passing the said fluid directly through a mass of granular material which is subjected to a continuous tumbling-over movement so that the fluid intimately mixes with the material, and thereby causing the said substances to be deposited on the material by condensation by maintaining the material at a relatively low temperature.

5. A method for the extraction from gaseous fluids of condensable substances carried thereby which consists in passing the said fluids directly through a mass of granular material which is subjected to a continuous tumbling-over movement so that the fluid intimately mixes with the material, thereby causing the said substances to be deposited on the material by condensation, and damping the said material with a liquid suitable for promoting condensation with the particular gaseous fluid under treatment.

ADAM HELMER PEHRSON.